US008877093B2

(12) United States Patent
LaCourse et al.

(10) Patent No.: US 8,877,093 B2
(45) Date of Patent: Nov. 4, 2014

(54) CERAMIC SCINTILLATOR BODY AND SCINTILLATION DEVICE

(75) Inventors: Brian C. LaCourse, Pepperell, MA (US); Anne B. Hardy, Paris (FR); Hélène Loetitia Rétot, Avignon (FR); Qiwei Chen, Shanghai (CN); Xiaofeng Peng, Shanghai (CN); Bruno Viana, Montgeron (FR); Morteza Zandi, Webster, MA (US)

(73) Assignees: Saint-Gobain Ceramics & Plastics, Inc., Worcester, MA (US); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 13/142,756

(22) PCT Filed: Dec. 24, 2009

(86) PCT No.: PCT/US2009/069538
§ 371 (c)(1), (2), (4) Date: Nov. 9, 2011

(87) PCT Pub. No.: WO2010/078223
PCT Pub. Date: Jul. 8, 2010

(65) Prior Publication Data
US 2012/0049118 A1 Mar. 1, 2012

(51) Int. Cl.
*C09K 11/77* (2006.01)
*G01T 1/20* (2006.01)
*C04B 35/50* (2006.01)
*C04B 35/645* (2006.01)

(52) U.S. Cl.
CPC ....... *C09K 11/7769* (2013.01); *C04B 2235/658* (2013.01); *C04B 35/50* (2013.01); *C04B 2235/3227* (2013.01); *C04B 2235/77* (2013.01); *C04B 2235/3225* (2013.01); *C04B 2235/5454* (2013.01); *C04B 2235/3224* (2013.01); *C04B 35/6455* (2013.01); *C04B 2235/9653* (2013.01); *C04B 2235/6567* (2013.01)
USPC .............................. 252/301.4 R; 250/370.11

(58) Field of Classification Search
USPC ................. 252/301.4 R, 301.17; 250/370.11, 250/370.12
See application file for complete search history.

(56) References Cited

U.S. PATENT DOCUMENTS 3,988,586 A * 10/1976 Stuart et al. .............. 250/390.11
4,421,671 A 12/1983 Cusano et al.
(Continued)

FOREIGN PATENT DOCUMENTS

CN 200410053427 A 8/2004
CN 200410053428 8/2004
(Continued)

OTHER PUBLICATIONS

R. Babu et al., "Calorimetric measurements on rare earth pyrohafnates RE2Hf2O7 (RE=La,Eu,Gd)," Elsevier, Journal of Alloys and Compounds, 265 (1998), Received Jun. 7, 1997; received in revised form Jul. 21, 1997, pp. 137-139.

(Continued)

*Primary Examiner* — Carol M Koslow
*Assistant Examiner* — Lynne Edmondson
(74) *Attorney, Agent, or Firm* — Abel Law Group, LLP; Robert N. Young

(57) ABSTRACT

A polycrystalline ceramic scintillator body includes a ceramic scintillating material comprising an oxide of gadolinium (Gd) and a second rare earth element (Re). The ceramic scintillating material has a composition, expressed in terms of molar percentage of oxide constituents, that includes greater than fifty-five percent (55%) $Gd_2O_3$ and a minority percentage Of $Re_2O_3$. The ceramic scintillating material includes an activator.

16 Claims, 3 Drawing Sheets

(56) References Cited

U.S. PATENT DOCUMENTS

| | | | |
|---|---|---|---|
| 4,466,929 A | 8/1984 | Greskovich et al. | |
| 4,473,513 A * | 9/1984 | Cusano et al. | 264/1.22 |
| 4,518,545 A | 5/1985 | Cusano et al. | |
| 4,518,546 A | 5/1985 | Greskovich et al. | |
| 4,525,628 A | 6/1985 | DiBianca et al. | |
| 4,571,312 A | 2/1986 | Greskovich et al. | |
| 4,747,973 A * | 5/1988 | Cusano et al. | 252/301.4 R |
| 4,980,560 A | 12/1990 | Bryan et al. | |
| 5,116,559 A | 5/1992 | Dole et al. | |
| 5,116,560 A | 5/1992 | Dole et al. | |
| 5,213,712 A | 5/1993 | Dole | |
| 5,296,163 A | 3/1994 | Leppert et al. | |
| 5,318,722 A | 6/1994 | Tsoukala et al. | |
| 5,484,750 A | 1/1996 | Greskovich et al. | |
| 5,521,387 A | 5/1996 | Riedner et al. | |
| 5,562,860 A | 10/1996 | Grabmaier et al. | |
| 5,640,016 A | 6/1997 | Matsuda et al. | |
| 5,676,891 A | 10/1997 | Boedinger | |
| 5,882,547 A | 3/1999 | Lynch et al. | |
| 6,093,347 A | 7/2000 | Lynch et al. | |
| 6,197,719 B1 | 3/2001 | Choudhary et al. | |
| 6,323,489 B1 | 11/2001 | McClellan | |
| 6,340,436 B1 | 1/2002 | Yamada et al. | |
| 6,384,417 B1 | 5/2002 | Okumura et al. | |
| 6,504,156 B1 | 1/2003 | Takahara et al. | |
| 6,822,240 B2 | 11/2004 | Francke et al. | |
| 6,967,330 B1 | 11/2005 | Lempicki et al. | |
| 7,329,370 B2 | 2/2008 | Kim et al. | |
| 7,531,109 B2 | 5/2009 | LaCourse et al. | |
| 2001/0028700 A1 | 10/2001 | Duclos et al. | |
| 2002/0013215 A1 | 1/2002 | Nakamura | |
| 2003/0183806 A1 | 10/2003 | Lyons | |
| 2003/0193040 A1 | 10/2003 | Venkataramani et al. | |
| 2005/0087724 A1* | 4/2005 | Kim et al. | 252/301.4 R |
| 2007/0131908 A1 | 6/2007 | Krishna et al. | |
| 2007/0292330 A1 | 12/2007 | Kurata et al. | |
| 2008/0025895 A1 | 1/2008 | Hosokawa et al. | |
| 2008/0128623 A1 | 6/2008 | Srivastava | |
| 2008/0179566 A1* | 7/2008 | Ronda et al. | 252/301.4 S |
| 2009/0189121 A1 | 7/2009 | LaCourse et al. | |
| 2012/0001074 A1 | 1/2012 | Hardy et al. | |
| 2012/0012787 A1 | 1/2012 | LaCourse et al. | |
| 2012/0085972 A1 | 4/2012 | LaCourse et al. | |

FOREIGN PATENT DOCUMENTS

| | | |
|---|---|---|
| CN | 200510025813 A | 5/2005 |
| CN | 1818017 A | 8/2006 |
| CN | 101265098 A | 9/2008 |
| CN | 101270283 A | 9/2008 |
| CN | 20081011236 A | 9/2008 |
| EP | 0088820 A1 * | 9/1983 |
| EP | 0166566 A2 | 1/1986 |
| EP | 0097300 B1 | 6/1988 |
| EP | 0297269 A1 | 1/1989 |
| EP | 0419847 A1 | 4/1991 |
| EP | 1028154 A1 | 8/2000 |
| JP | 59030883 A | 2/1984 |
| JP | 6438491 A | 2/1989 |
| JP | 1242456 A | 9/1989 |
| JP | 2073902 A | 3/1990 |
| JP | 2213403 A | 8/1990 |
| JP | 11029767 A | 2/1999 |
| JP | 11315278 A | 11/1999 |
| JP | 2002275465 A | 9/2002 |
| WO | 2005028591 A1 | 3/2005 |
| WO | 2005110943 A1 | 11/2005 |

OTHER PUBLICATIONS

The International Search Report and the Written Opinion for International Application No. PCT/US2009/069532 received from the International Searching Authority (ISA/KR), dated Aug. 17, 2010, 10 pages.

The International Search Report and the Written Opinion for International Application No. PCT/US2009/069533 received from the International Searching Authority (ISA/KR), dated Aug. 13, 2010, 10 pages.

The International Search Report and the Written Opinion for International Application No. PCT/US2009/069538 received from the International Searching Authority (ISA/KR), dated Jul. 30, 2010, 10 pages.

The International Search Report and the Written Opinion for International Application No. PCT/US2009/069539 received from the International Searching Authority (ISA/KR), dated Jul. 16, 2010, 8 pages.

C. Greskovich et al., "Ceramic Scintillators," Annual Reviews Inc., General Electric, Corporate Research and Development, Ceramics Laboratory, Niskayuna, New York, Annu. Rev. Mater. Sci. 27, 1997, pp. 69-88.

David J. Krus et al., "Preision linear and two-dimensional scintillation crystal arrays for x-ray and gamma ray imaging applications," Bicron, a division of Saint-Gobain Industrial Ceramics, Inc., Presented at the SPIE International Synosium on Optical Science, Engineering and Instrumentation, dated Jul. 18-23, 1999, Hard X-Ray, Gamma-Ray and Neutron Detector Physics (SPIE vol. 3768), 12 pages.

C. De Mello Donega et al., "Non-Radiative Relaxation Processes of the Pr3+ Ion in Solids," Pergamon, J. Phys. Chem. Solids vol. 56, No. 5, Elesvier Science Ltd., Received Jun. 30, 1994, Accepted Oct. 13, 1994, pp. 673-685.

Frank Schrey, "Effect of pH on the Chemical Preparation of Barium-Strontium Titanate," Journal of the American Ceramic Society, vol. 48, No. 8, Bell Telephone Laboratories, Inc., Murray Hill, New Jersey, dated Aug. 1965, 5 pages.

G.Z. Li et al., "Sol-Gel Fabrication and Photoluminescence Properties of $SiO_2$ @ $Gd_2O_3$:$Eu^{3+}$ Core-Shell Particles," Journal of Nanoscience and Nanotechnology: A Special Issue on SWCNT Growth Mechanisms, vol. 6, No. 5, <www.aspbs.com./jnn>, American Scientific Publishers, dated May 2006, 8 pages.

H. Morkoc et al., "Large-band-gap SiC, III-V nitride, and II-VI ZnSe-based semiconductor device technologies," American Institute of Physics, J. App. Phys. 73 (3), dated Aug. 1, 1994, downloaded Jan. 27, 2005, 36 pages.

E.A. Ivanova et al., "Synthesis of Low-Agglomerated Nanoprecursors in the $ZrO_2$-$HfO_2$-$Y_2$-$O_3$ System," Advanced Study Center Co. Ltd., Rev.Adv.Mater.Sci. 10 (2005), Received Jun. 17, 2005, pp. 357-361.

Y.M. Ji et al., "Structure and luminescence of $HfO_2$-codoped $Gd_2O_3$:Eu phosphors," Shanghai Institute of Ceramics, Chinese Academy of Sciences,Shanghai, PR China, Elsevier, Journal of Luminescence, 122-123 (2007), Available online Mar. 20, 2006, pp. 984-986.

Paul Lecoq et al., "New Inorganic Scintillation Materials Development for Medical Imaging," IEEE Transaction on Nuclear Science, vol. 49, No. 4, dated Aug. 2002. 4 pages.

L.H. Brixner, "Structural and Luminescent Properties of the $Ln_2Hf_2O_7$-type Rare Earth Hafnates," Mat. Res. Bull., vol. 19, No. 2, dated 1984, pp. 143-149.

V.V. Nagarkar et al., "Structured LiI Scintillator for Thermal Neutron Imaging," IEEE Transactions on Nuclear Science, vol. 48, No. 6, dated Dec. 2001, 5 pages.

V. Pelova et al., "Luminescence of $Y_2O_3$: Eu and $Gd_2O_3$: Eu Depending on Precursor and Activation Temperature," Crystal Research Technology, 33, dated 1998, 1, pp. 125-128.

Richard A. Swalin, "Thermodynamics of Solids," University of Minnesota, John Wiley & Sons, Inc., dated 1972, 5 pages.

Arhtur L. Robinson, "A Chemical Route to Advanced Ceramics," American Association for the Advancement of Science, <http://www.jstor.org/stable/1697490>, Science, New Series, vol. 233, No. 4759 (Jul. 4, 1986), Accessed Sep. 30, 2011, 4 pages.

Christopher R. Stanek et al., "Prediction of Rare-earth $A_2Hf_2O_7$ Pyrochlore Phases," Communications of the American Ceramic Society, vol. 85, No. 8, Manuscript No. 187131, Presented at the 104th Annual meeting of the American Ceramic Society, dated Aug. 2002, 3 pages.

(56) References Cited

OTHER PUBLICATIONS

N. Teneze et al., "Cation-deficient perovskite-related compounds (Ba,La)nTin-1O3n (n=4, 5, and 6): a Rietveld refinement from neutron powder diffraction data," Pergamon, Materials Research Bulletin, 35, dated 2000, 12 pages.

Shunkichi Ueno et al., "High Temperature Water Vapor Corrosion Behavior of Titanium Aluminate (al2TiO5)," Synergy Materials Research Center, National Institute of Advanced Industrial Science and Technology, Journal of the Ceramic Society of Japan, 111 [11], dated 2003, pp. 860-862.

Yaming Ji et al., "La2Hf2O7:Ti4+ ceramic scintillator for x-ray imaging," Shanghai Institute of Ceramics, Chinese Academy of Sciences, Materials Research Society, J. Mater. Res., vol. 20, No. 3, dated Mar. 2005, 4 pages.

Ya-Ming Ji et al., "Preparation and spectroscopic properties of La2Hf2O7:Tb," Science Direct, R&D Center of Shanghai Institute of Ceramics, Chinese Academy of Sciences, Shanghai 200050, PR of China, Elsevier, Materials LettersVolume 59, dated 2005, pp. 868-871.

Yaming Ji et al., "Fabrication of transparent La2Hf2O7 ceramics from combustion synthesized powders," R&D Center of Shanghai Institute of Ceramics, Chinese Academy of Sciences, Shanhai 200050, PR China, Elsevier, Sicence Direct, Materials Research Bulletin, vol. 40, dated 2005, pp. 553-559.

Lubomir Havlak, "Preparation and luminescence of Lu4Hf3O12 powder samples doped by trivalent Eu, Tb, Ce, Pr, Bi ions," Institute of Physics AS CR, Na Slovance 2, CZ-18221 Praue 8, Czech Republic, Elsevier, Optical Materials, vol. 32, dated 2010, pp. 1372-1374.

Zeli Soares Macedo et al., "Laser-Sintered Bismuth Germanate Ceramics as Scintillator Devices," Journal of the American Ceramic Society, vol. 87, No. 6, dated Jun. 2004, pp. 1076-1081.

M. Nikl, "Wide Band Gap Scintillation Materials: Progress in the Technology and Material Understanding," Institute of Physics, Academy of Sciences of the Czech Republic, Cukrovarnicka 10, CZ-162 53, Prague, Czech Republic, phys. stat. sol. (a) 178, 595, dated 2000, 26 pages.

D. W. Cooke, et al. "Crystal Growth and Optical Characterization of Cerium Doped Lu1.8Y0.2SiO5", Journal of Applied Physics, Dec. 15, 2000, p. 7360-7362, vol. 88, No. 12.

* cited by examiner

CERAMIC SCINTILLATOR BODY AND SCINTILLATION DEVICE

CROSS-REFERENCE TO RELATED APPLICATIONS

The present application claims priority to PCT Application No. PCT/US09/69538, filed Dec. 24, 2009, entitled "CERAMIC SCINTILLATOR BODY AND SCINTILLATION DEVICE," by Brian C. LaCourse et al., which in turn claims priority to U.S. Provisional Application No. 61/141,564 filed Dec. 30, 2008, entitled "CERAMIC SCINTILLATOR BODY AND SCINTILLATION DEVICE," by Brian C. LaCourse et al., all of which are all incorporated by reference herein in their entireties.

FIELD OF THE DISCLOSURE

The present disclosure is directed to scintillation devices, particularly scintillation devices for industrial applications, and to ceramic scintillator bodies.

BACKGROUND

Scintillation devices are used in a variety of industrial applications. For example, scintillation devices are used for well logging in the oil and gas industry and for imaging scans in the medical field. Typically, scintillation devices include scintillator bodies, such as a scintillator crystal, produced from a material that is effective to detect gamma rays, x-rays, ultraviolet radiation or other radiation. The scintillator bodies can absorb x-rays or other radiation and emit light. The emitted light can sometimes be recorded on film. Generally, the scintillator bodies are enclosed in casings or sleeves that include a window to permit radiation-induced scintillation light to pass out of the crystal package. The light passes to a light-sensing device such as a photomultiplier tube, a photodiode, or another photosensor that converts the light emitted from the scintillator body into electrical pulses. In other applications, multiple scintillator bodies can be used in imaging arrays for medical imaging equipment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed articles, systems, or methods. Moreover, some statements may apply to some inventive features but not to others.

The demands of well logging and medical imaging benefit from scintillation devices that are accurate under harsh and fast conditions. Various classes of scintillating materials can be used to produce scintillator bodies depending on intended applications. For example, single crystal oxyorthosilicates, such as lutetium yttrium oxyorthosilicate (LYSO), are often used in medical imaging applications, such as positron emission tomography (PET). These materials are typically characterized by relatively high stopping power and fast decay times. Nonetheless, LYSO is often characterized by low light output, and performance in PET scan applications can suffer from electron emission resulting from the $\beta^-$ decay of lutetium.

Another class of scintillating materials includes ceramic rare earth sulfoxylates, such as gadolinium oxysulfide (GOS). Ceramic materials such as GOS can be less costly than single crystal materials, such as LYSO. However, the hexagonal structure of ceramic rare earth sulfoxylates often causes "birefringence," or light scattering at grain boundaries. As a result, such materials are less transparent and exhibit less light output or brightness than many single crystal materials. Consequently, improvements in scintillator efficiency and brightness that might be caused by the compatibility of ceramic rare earth sulfoxylates with certain activators are typically diminished by the reduced transparency that results from their hexagonal structures.

Figure 1:
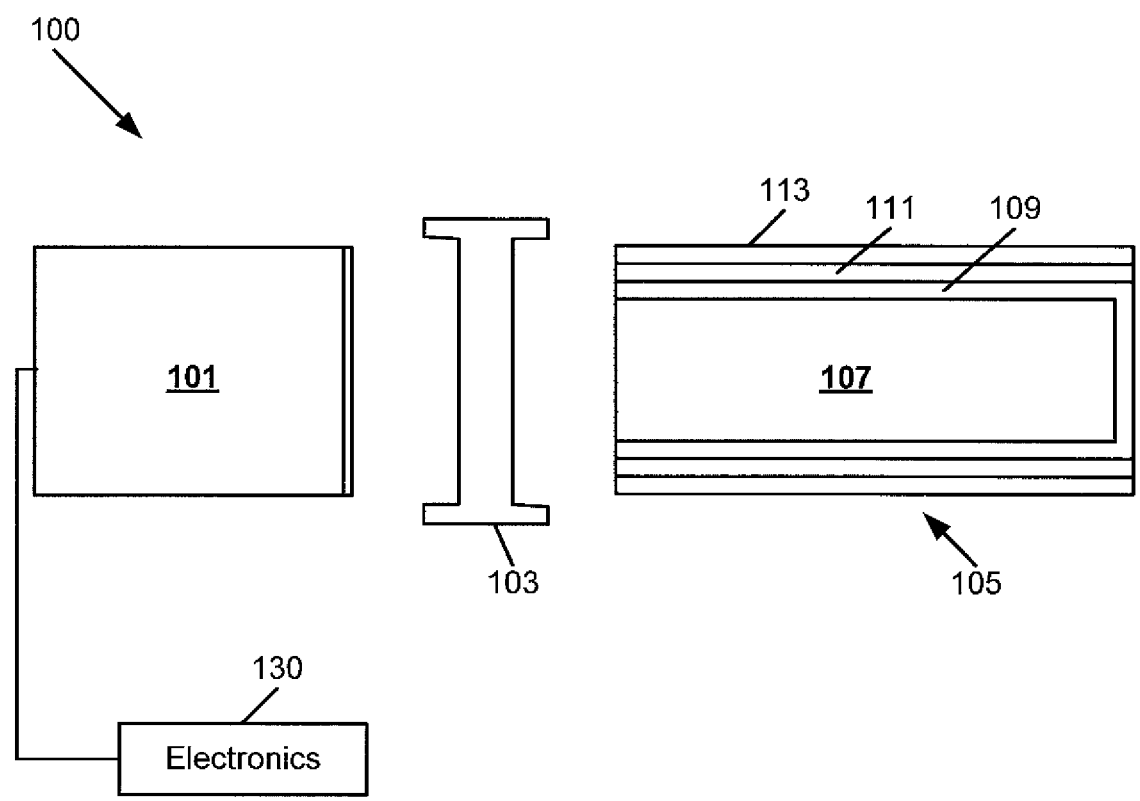
FIG. 1 is a block diagram illustrating a particular embodiment of a radiation detector device.

FIG. 1 shows a particular embodiment of a radiation detector device 100. The radiation detector device 100 includes a photosensor 101, a light pipe 103, and a scintillation device 105. Though the photosensor 101, the light pipe 103, and the scintillation device 105 are illustrated separately from each other, it is to be understood that the photosensor 101 and the scintillation device 105 are adapted to be coupled to each other via the light pipe 103.

In one embodiment, the photosensor 101 includes a device capable of spectral detection and resolution. For example, the photosensor 101 can comprise a conventional photomultiplier tube (PMT), a hybrid photodetector, or a photodiode. The photosensor 101 is adapted to receive photons emitted by the scintillation device 105 after absorbing x-rays or other radiation, and the photosensor 101 is adapted to produce electrical pulses or imaging signals from photons that it receives.

The electronics 130 can include one or more electronic devices, such as an amplifier, a pre-amplifier, a discriminator, an analog-to-digital signal converter, a photon counter, another electronic device, or any combination thereof. The photosensor 101 can be housed within a tube or housing made of a material capable of protecting electronics associated with the photosensor 101, such as a metal, metal alloy, other material, or any combination thereof.

As illustrated, the light pipe 103 is disposed between the photosensor 101 and the scintillation device 105 and facilitates optical coupling between the photosensor 101 and the scintillation device 105. In one embodiment, the light pipe 103 can include a quartz light pipe, plastic light pipe, or another light pipe. In another embodiment, the light pipe 103 can comprise a silicone rubber interface that optically couples an output window 119 of the scintillation device 105 with an input window of the photosensor 101. In some embodiments, multiple light pipes can be disposed between the photosensor 101 and the scintillation device 105.

The scintillation device 105 includes a scintillator body 107 housed within a casing 115. The scintillator body 107 can have various shapes, such as a rectangular shape, or a cylindrical surface including flat end faces. It will be appreciated that the surface finish of the scintillator body 107 can be sanded, polished, ground, etc., as desired.

The scintillator body 107 has a length that extends from a first end that is proximal to the photosensor 101 and a second end that is distal from the photosensor 101. The scintillation device 105 also includes a reflector 109 substantially surrounding the scintillator body 107. In addition, the scintillation device 105 can include a boot 111 that acts as a shock absorber to prevent damage to the scintillator body 107. The boot 111 can comprise a polymer, such as silicone rubber, another material, or a combination thereof. Further, the scintillation device 105 can also include a casing 113.

In a particular embodiment, the scintillator body 107 is a polycrystalline ceramic scintillator body that includes a ceramic scintillating material that comprises an oxide of gadolinium and a second rare earth element. Expressed in terms of oxide constituents, gadolinium oxide ($Gd_2O_3$) is a primary component of the composition and comprises greater than fifty-five percent of the composition based on molar percentage. For instance, gadolinium oxide can comprise at least fifty-seven percent (57%) of the composition based on molar percentage, such as greater than or equal to approximately sixty percent (60%) of the composition based on molar percentage, or greater than or equal to approximately two-thirds of the composition based on molar percentage.

Expressed in terms of oxide constituents, a second rare earth oxide ($Re_2O_3$) is a secondary component of the composition and comprises a minority percentage of the composition based on molar percentage. The second rare earth oxide has a distinct composition from gadolinium oxide ($Gd_2O_3$). For example, the second rare earth oxide can include lutetium oxide ($Lu_2O_3$), yttrium oxide ($Y_2O_3$), lanthanum oxide ($La_2O_3$), or another rare earth oxide distinct from gadolinium oxide. In another example, the scintillating material can include multiple second compounds, such as a combination of second rare earth oxides. In one embodiment, the composition of the ceramic scintillating material includes at least five percent (5%) $Re_2O_3$.

In a particular embodiment, the composition also includes an activator. The activator causes the scintillator body 107 to emit visible light after absorbing gamma radiation, x-rays, ultraviolet radiation, or other radiation. The activator can include a rare earth element, such as a lanthanide element. For example, the activator can include praseodymium. In an illustrative embodiment, the activator can comprise less than ten percent (10%) of the composition, such as less than or equal to approximately five percent (5%) or less than or equal to approximately two percent (2%) of the composition based on molar percentage. In a particular embodiment, the scintillator body is characterized by a decay time of less than 1 ms, such as less than or equal to approximately 0.5 ms or less than or equal to approximately 0.1 ms.

The scintillator body 107 can be characterized by a density of at least 99.9% of theoretical density. In addition, the scintillator body 107 can be characterized by a scintillating efficiency of at least eight percent.

Figure 2:
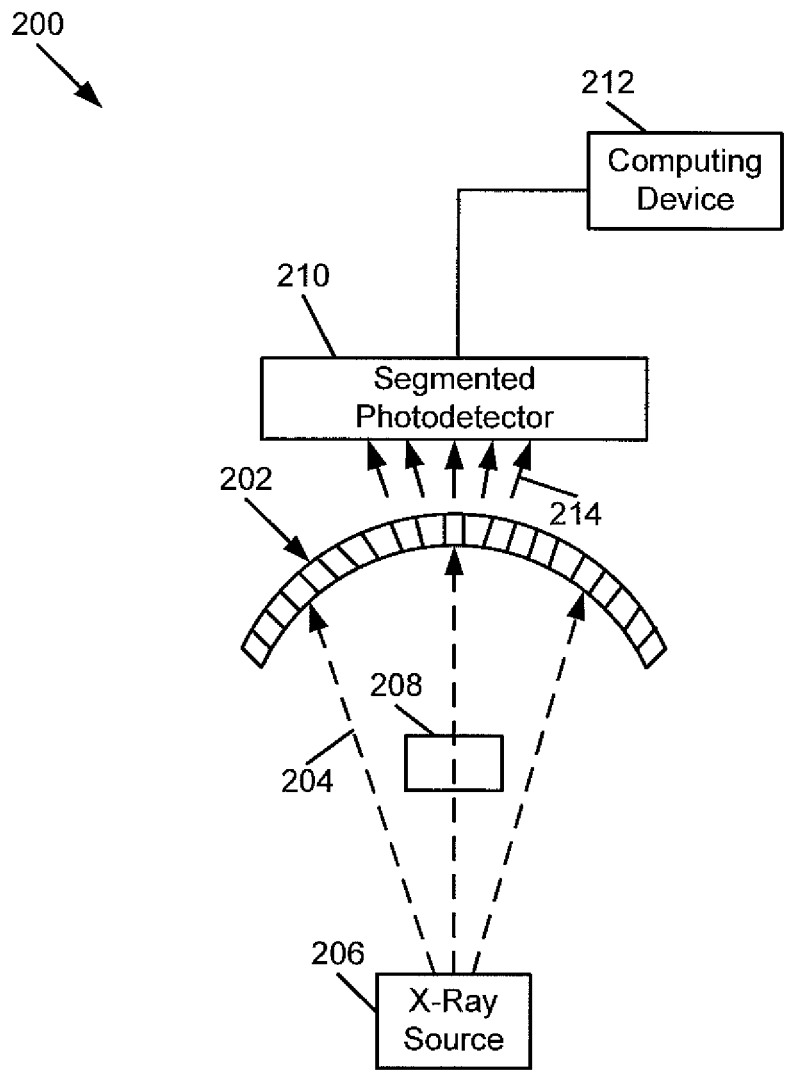
FIG. 2 is a block diagram illustrating a particular embodiment of x-ray computed tomography scanning equipment.

FIG. 2 illustrates a particular embodiment of x-ray equipment 200, such as x-ray computed tomography (CT) equipment. The x-ray scanning equipment 200 includes an array 202 of scintillator devices, or pixels, and a segmented photodetector 210. The x-ray scanning equipment 200 also includes an x-ray source 206 adapted to emit x-rays 204, e.g., in a fan-shaped or cone-shaped pattern. The x-ray source 206 and the array 202 of scintillator devices may be adapted to rotate about an object 208. For example, the x-ray source 206 and the array 202 may be adapted to rotate opposite each other substantially along a circle centered about the object 208 and at substantially equal rates.

In a particular embodiment, each pixel in the array 202 can include a scintillator body. Each scintillator body is adapted to absorb x-rays 204 emitted by the x-ray source 206 and to emit scintillation light 214 that feeds into the segmented photodetector 210. The segmented photodetector 210 is adapted to measure scintillation light 214 received from each pixel and to determine from which pixel the particular scintillation light is received. The segmented photodetector 210 is adapted to produce signals based on the amount of scintillation light emitted by each scintillation device in the array 202 from various angles and to send the signals to the computing device 212. The computing device 212 is adapted to construct an image of the object 208 based on the signals received from the segmented photodetector 210.

In a particular embodiment, each scintillator body is a polycrystalline ceramic scintillator body formed from a composition that includes a ceramic scintillating material that comprises an oxide of gadolinium and a second rare earth element. Expressed in terms of oxide constituents, gadolinium oxide ($Gd_2O_3$) is a primary component of the composition and comprises greater than fifty-five percent of the composition based on molar percentage. For instance, gadolinium oxide can comprise at least fifty-seven percent (57%) of the composition based on molar percentage, such as greater than or equal to approximately sixty percent (60%) of the composition based on molar percentage, or greater than or equal to approximately two-thirds of the composition based on molar percentage.

Expressed in terms of oxide constituents, a second rare earth oxide ($Re_2O_3$) is a secondary component of the composition and comprises a minority percentage of the composition based on molar percentage. The second rare earth oxide has a distinct composition from gadolinium oxide ($Gd_2O_3$). For example, the second rare earth oxide can include lutetium oxide ($Lu_2O_3$), yttrium oxide ($Y_2O_3$), lanthanum oxide ($La_2O_3$), or another rare earth oxide distinct from gadolinium oxide. In another example, the scintillating material can include multiple second compounds, such as a combination of second rare earth oxides. In one embodiment, the composition of the ceramic scintillating material includes at least five percent (5%) $Re_2O_3$.

In a particular embodiment, the composition also includes an activator. The activator can include a rare earth element, such as a lanthanide element. For example, the activator can include praseodymium. In an illustrative embodiment, the activator can comprise less than ten percent (10%) of the composition, such as less than or equal to approximately five percent (5%) or less than or equal to approximately two percent (2%) of the composition based on molar percentage. In a particular embodiment, the scintillator body is characterized by a decay time of less than 1 ms, such as less than or equal to approximately 0.5 ms or less than or equal to approximately 0.1 ms. Each scintillator body can be characterized by a density of at least 99.9% of theoretical density.

Figure 3:
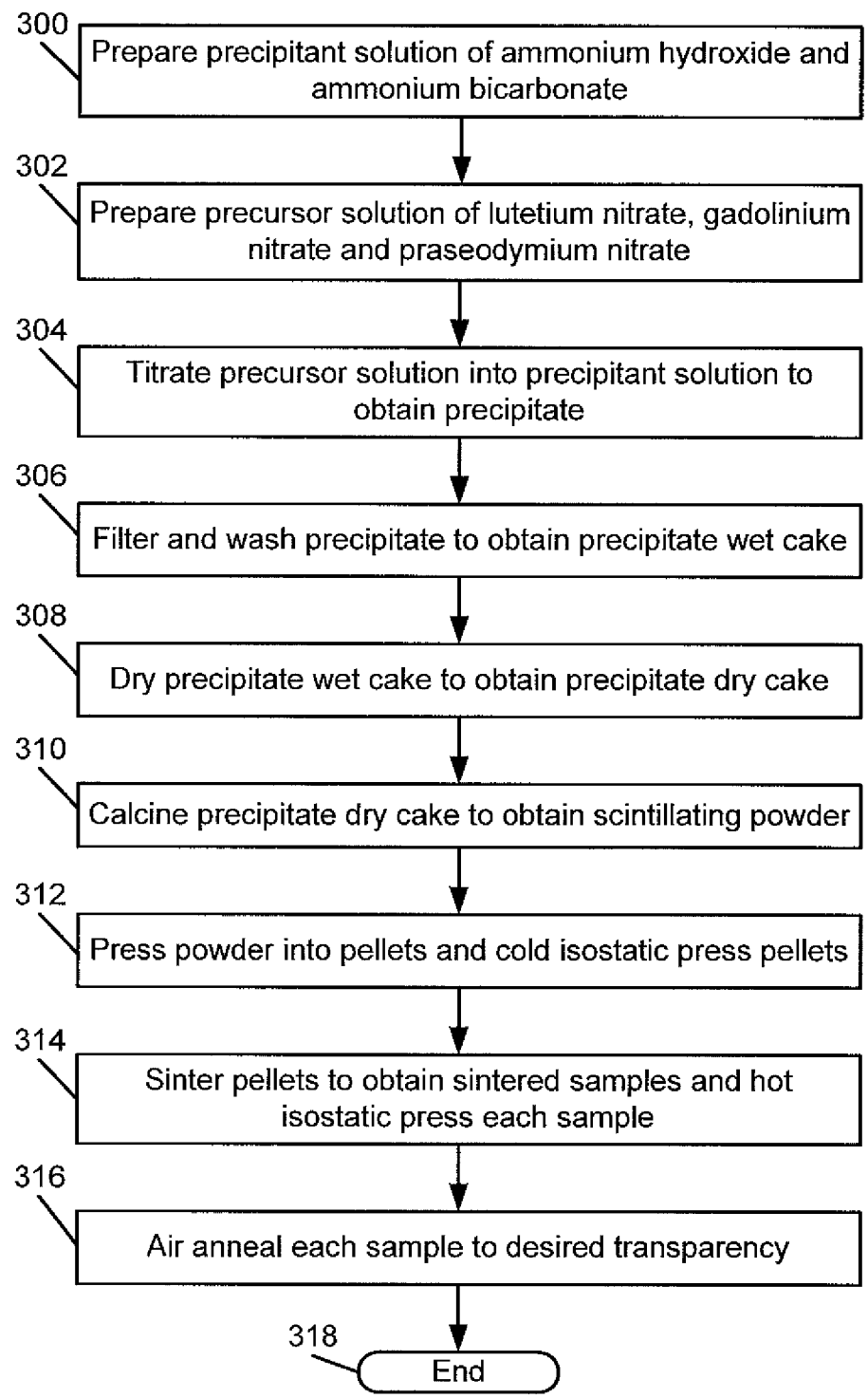
FIG. 3 is a flow diagram illustrating a method of producing a ceramic scintillator body.

FIG. 3 illustrates a particular embodiment of a method of producing a ceramic scintillator body. At block 300, a precipitant solution of ammonium hydroxide and ammonium bicarbonate is prepared. Moving to block 302, a precursor solution of lutetium nitrate, gadolinium nitrate and praseodymium nitrate is prepared. Proceeding to block 304, the precursor solution is titrated into the precipitant solution to form a precipitate. Continuing to block 306, the precipitate is filtered and washed, and a precipitate wet cake is obtained. For example, the precipitate can be washed using deionized water until a desired conductivity value of residual ions is reached. In another example, the precipitate can also be washed with ethanol to prevent agglomeration during drying.

Advancing to block 308, the precipitate wet cake is dried to obtain a precipitate dry cake. At block 310, the precipitate dry cake is calcined to obtain a scintillating powder having a composition represented by the general formula $La_2O_3$:Pr. Moving to block 312, the calcined powder can be formed into ceramic scintillator bodies by first die pressing the powder into pellets and then cold isostatic pressing the pellets. Proceeding to block 314, the pressed pellets are sintered to obtain sintered samples, and each sintered sample is hot isostatic pressed. Advancing to block 316, in a particular embodiment, each sample is air annealed to improve transparency. The method terminates at 318.

EXAMPLE

In one example, a precipitant solution of ammonium hydroxide ($NH_4OH$) and ammonium bicarbonate ($NH_4HCO_3$) was prepared by adding 3M $NH_4OH$ and 1M NH4HCO3 to a beaker and mixing to form a uniform complex precipitant solution, diluted to approximately 500 ml. Next, a solution of precursor nitrates was prepared by mixing correct proportions of $Gd(NO_3)_3$, $Lu(NO_3)_3$ and $Pr(NO_3)_3$, diluted to 1.5 L. The precursor solution was titrated into the precipitant solution to form a precipitate. The precipitate was filtered from solution and washed with deionized water and Ethanol.

The precipitate wet cake was dried in an oven at approximately 60° C., and the dried cake was calcined at 850° C. for 2 hrs in order to form a scintillating material having a composition of $Gd_2O_3$ and $Lu_2O_3$ doped with Pr.

The calcined powder can be formed into ceramic scintillator bodies by first die pressing the powder into approximately 12 mm diameter pellets and then cold isostatic pressing the pellets to 30 ksi ($2.07 \times 10^8$ Pa). The pressed pellets were then sintered in air at between 1500° C. and 1600° C. for 3 hrs. Each sintered sample was then hot isostatic pressed at between 1400° C. and 1600° C. for 1 hr in Argon at 30 ksi to produce a ceramic scintillator body.

It is found that characteristics of the powder scintillating material can affect density and transparency of the resulting scintillator body. Some prior methods aim to produce powders having a uniform distribution of extremely small particles one the order of 1-5 nm in diameter, while other prior methods mix large (e.g., greater than 500 nm) and small (1-5 nm) sizes to attempt to fill any gaps between particles. However, it is found that a powder having substantially spherical particles between 10 nm and 500 nm, with a narrow particle size distribution is advantageous. For instance, a powder scintillating material having substantially spherical particles, where at least ninety percent of the particles have a size between approximately 50 nm and approximately 250 nm, such as approximately 66 nm to approximately 220 nm, can be used to produce a scintillator body having increased density and transparency.

In accordance with the embodiments described herein, a polycrystalline ceramic scintillator body includes a ceramic scintillating material comprising an oxide of gadolinium (Gd) and a second rare earth element (Re). The ceramic scintillating material has a composition including, expressed in terms of molar percentage of oxide constituents, greater than fifty-five percent (55%) $Gd_2O_3$ and a minority percentage of $Re_2O_3$. The ceramic scintillating material includes an activator. In a particular embodiment, the activator can include praseodymium.

Praseodymium is not equally compatible with all scintillator bodies. For example, praseodymium often suffers from performance drawbacks when used with rare earth scintillating materials having short atomic distances. These short atomic distances can cause non-radiative relaxation of praseodymium, thereby reducing light output and scintillator efficiency. The presence of sulfur in gadolinium sulfoxylate (GOS) and other rare earth sulfoxylates increases atomic distances and prevents non-radiative relaxation of praseodymium. However, the hexagonal structure of rare earth sulfoxylates tends to reduce transparency and, hence, brightness and scintillator efficiency. In addition, GOS and other rare earth sulfoxylates can be more expensive to produce than gadolinium oxide, for example.

Scintillating materials produced from many rare earth oxides exhibit cubic lattice structures. These cubic structures contribute to greater transparency in corresponding scintillator bodies and reduce or eliminate birefringence. However, while some rare earth oxides, such as gadolinium oxide, exhibit more cubic lattice structures than rare earth sulfoxylates, their shorter atomic distances contribute to non-radiative relaxation of praseodymium. Hence, these rare earth oxides are typically considered less compatible with praseodymium for scintillating purposes and are typically used with more compatible activators, such as europium. Gadolinium oxide is considered by the prior art to be particularly undesirable. For example, the prior art suggests that yttria-gadolinia scintillator bodies having mole ratios above fifty percent (50%) of gadolinium oxide exhibit poor light output and grain boundary cracking, because gadolinium oxide is not cubic at room temperature. Preferred mole ratios of gadolinium oxide in the prior art are between thirty and forty percent.

Nonetheless, it is found that scintillator bodies comprising rare earth oxides doped with praseodymium exhibit a shorter decay time than scintillator bodies comprising rare earth oxides doped with other rare earth activator elements, such as europium. For instance, decay time in rare earth oxides, such as yttria-gadolinia oxides, doped with europium is typically on the order of 1 ms. On the other hand, decay time in scintillator bodies produced from materials containing a majority of gadolinium oxide and using praseodymium as an activator can be on the order of 0.1 ms. This faster decay time contributes to faster scan rates in medical applications, such as computed tomography (CT).

Additionally, scintillator bodies comprising rare earth oxides doped with praseodymium exhibit lower afterglow and residual light than scintillator bodies comprising rare earth oxides doped with other rare earth activators elements, such as europium. Residual light, also known as "persistence" can affect resolution in applications such as medical imaging by producing a "bleeding" effect on images. The use of praseodymium as an activator can reduce such bleeding and image artifacts and improve image resolution in such medical applications.

Ceramic processes are preferably used to produce scintillator bodies formed from compositions disclosed herein, rather than traditional single crystal growth methods. Such processes and the raw materials used enable these scintillator bodies to be produced at lower cost than rare earth sulfoxylate materials, such as GOS:Pr.

The illustrations of the embodiments described herein are intended to provide a general understanding of the structure of the various embodiments. The illustrations are not intended to serve as a complete description of all of the elements and features of the compositions, apparatuses, systems, or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

According to a first aspect, a polycrystalline ceramic scintillator body includes a ceramic scintillating material comprising an oxide of gadolinium (Gd) and a second rare earth element (Re). The ceramic scintillating material has a composition, expressed in terms of molar percentage of oxide constituents, that includes greater than fifty-five percent (55%) $Gd_2O_3$ and a minority percentage of $Re_2O_3$. The ceramic scintillating material includes an activator.

In one embodiment of the first aspect, $Re_2O_3$ comprises lutetium oxide ($Lu_2O_3$). In another embodiment of the first aspect, $Re_2O_3$ comprises yttrium oxide ($Y_2O_3$). In a further embodiment of the first aspect, $Re_2O_3$ comprises lanthanum oxide ($La_2O_3$).

The activator can comprise a rare earth element, such as a lanthanide element. For instance, the activator can include praseodymium. In an illustrative embodiment, the activator can comprise less than five percent of the composition based on molar percentage, such as less than or equal to two percent of the composition based on molar percentage.

According to a second aspect, a scintillation device includes a polycrystalline ceramic scintillator body that includes a ceramic scintillating material comprising an oxide of gadolinium (Gd) and a second rare earth element (Re). The ceramic scintillating material has a composition, expressed in terms of molar percentage of oxide constituents, that includes greater than fifty-five percent (55%) $Gd_2O_3$ and a minority percentage of $Re_2O_3$ a first rare earth oxide. The ceramic scintillating material includes an activator.

In one embodiment of the second aspect, the ceramic scintillating material has a composition including, expressed in terms of molar percentage of oxide constituents, at least fifty-seven percent (57%) $Gd_2O_3$, such as at least sixty percent (60%) $Gd_2O_3$ or at least sixty-six percent (66%) $Gd_2O_3$.

In another embodiment of the second aspect, the activator includes praseodymium. In yet another embodiment of the second aspect, the scintillator body is characterized by a decay time of less than 1 ms, such as less than or equal to approximately 0.5 ms or less than or equal to approximately 0.1 ms.

In a further embodiment of the second aspect, the scintillation body can be characterized by a density of at least 99.9% of theoretical density.

In a third aspect, a computed-tomography (CT) apparatus includes an array of scintillating devices. Each of the scintillating devices includes a polycrystalline ceramic scintillator body comprising a ceramic scintillating material comprising an oxide of gadolinium (Gd) and a second rare earth element (Re). The ceramic scintillating material has a composition, expressed in terms of molar percentage of oxide constituents, that includes greater than fifty-five percent (55%) $Gd_2O_3$ and a minority percentage of $Re_2O_3$. In one embodiment, the composition of the ceramic scintillating material, expressed in terms of molar percentage of oxide constituents, includes at least five percent (5%) $Re_2O_3$.

According to a fourth aspect, a ceramic scintillating powder includes a ceramic scintillating material comprising an oxide of gadolinium (Gd) and a second rare earth element (Re). The ceramic scintillating material has a composition including, expressed in teinis of molar percentage of oxide constituents, greater than fifty-five percent (55%) $Gd_2O_3$ and a minority percentage of $Re_2O_3$. The ceramic scintillating material includes an activator.

In one embodiment of the fourth aspect, the ceramic scintillating material comprises a plurality of substantially spherical particles and wherein at least ninety percent of the particles are characterized by a particle size of from approximately 50 nm to approximately 250 nm. For example, at least ninety percent of the particles can be characterized by a particle size of from approximately 66 nm to approximately 220 nm.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A scintillation device comprising:
a polycrystalline ceramic scintillator body, comprising:
a ceramic scintillating material comprising $Gd_2O_3$ and $Re_2O_3$, where Re is a second rare earth element distinct from Gd, the ceramic scintillating material having a composition, expressed in terms of molar percentage of oxide constituents, including greater than sixty-six percent (66%) $Gd_2O_3$ and a minority percentage of $Re_2O_3$, wherein the ceramic scintillating material includes an activator that comprises praseodymium.

2. The scintillation device of claim 1, wherein $Re_2O_3$ comprises $Lu_2O_3$, $Y_2O_3$, or $La_2O_3$.

3. The scintillation device of claim 1, wherein the activator comprises less than or eaqual to five percent of the composition based on molar percentage.

4. The scintillation device of claim 3, wherein the activator comprises less than or equal to two percent of the composition based on molar percentage.

5. The scintillation device of claim 1, wherein the ceramic scintillating material includes more than one second rare earth elements that are distinct from Gd.

6. The scintillation device of claim 1 wherein the scintillator body is characterized by a decay time of less than 1 ms.

7. The scintillation device of claim 6, wherein the scintillator body is characterized by a decay time of less than or equal to approximately 0.5 ms.

8. The scintillation device of claim 7, wherein the scintillator body is characterized by a decay time of less than or equal to approximately 0.1 ms.

9. The scintillation device of claim 1, wherein the scintillator body is characterized by a density of at least 99.9% of theoretical density.

10. The scintillation device of claim 1, wherein the composition of the ceramic scintillating material, expressed in terms of molar percentage of oxide constituents, includes at least five percent (5%) $Re_2O_3$.

11. A ceramic scintillating powder comprising a ceramic scintillating material comprising $Gd_2O_3$ and $Re_2O_3$, where Re is a second rare earth element distinct from Gd, the ceramic scintillating material having a composition including, expressed in terms of molar percentage of oxide constituents, greater than sixty-six percent (66%) $Gd_2O_3$ and a minority percentage of $Re_2O_3$, wherein the ceramic scintillating material includes an activator comprising praseodymium.

12. The ceramic scintillating powder of claim 11, wherein the ceramic scintillating material comprises a plurality of substantially spherical particles and wherein at least ninety percent of the particles are characterized by a particle size of from approximately 50 nm to approximately 250 nm.

13. The ceramic scintillating powder of claim 12, wherein at least ninety percent of the particles are characterized by a particle size of from approximately 66 nm to approximately 220 nm.

14. A computed-tomography (CT) apparatus comprising:

an array of scintillating devices, wherein each of the scintillating devices includes a polycrystalline ceramic scintillator body comprising:

a ceramic scintillating material comprising $Gd_2O_3$ and $Re_2O_3$, where Re is a second rare earth element distinct from Gd, the ceramic scintillating material having a composition, expressed in terms of molar percentage of oxide constituents, including greater than sixty-six percent (66%) $Gd_2O_3$ and a minority percentage of $Re_2O_3$;

wherein the ceramic scintillating material includes an activator comprising praseodymium.

15. The scintillation device of claim 14, wherein the scintillator body is characterized by a decay time of less than or equal to approximately 1 ms.

16. The scintillation device of claim 14, wherein the scintillator body is characterized by a decay time of less than or equal to approximately 0.1 ms.

* * * * *

UNITED STATES PATENT AND TRADEMARK OFFICE
CERTIFICATE OF CORRECTION

PATENT NO. : 8,877,093 B2
APPLICATION NO. : 13/142756
DATED : November 4, 2014
INVENTOR(S) : Brian C. LaCourse et al.

Page 1 of 1

It is certified that error appears in the above-identified patent and that said Letters Patent is hereby corrected as shown below:

On the title page

Item 75, line 3, delete "Hélène Loetitia Rétot" and insert therefor -- Hélène Laetitia Rétot --

After item 65 Prior Publication Data, please insert item -- (60) Provisional application No. 61/141,564, filed on Dec. 30, 2008 --

Signed and Sealed this
Fifth Day of July, 2016

Michelle K. Lee
*Director of the United States Patent and Trademark Office*